United States Patent Office 3,580,864
Patented May 25, 1971

3,580,864
CHOLESTERIC-PHASE LIQUID-CRYSTAL COMPOSITIONS STABILIZED AGAINST TRUE-SOLID FORMATION, USING CHOLESTERYL ERUCYL CARBONATE
Newton N. Goldberg, Pittsburgh, Pa., and James L. Fergason, Kent, Ohio, assignors to Westinghouse Electric Corporation, Pittsburgh, Pa.
No Drawing. Filed Apr. 30, 1969, Ser. No. 820,658
Int. Cl. C07c 69/76; C09k 3/04
U.S. Cl. 252—408                                           8 Claims

ABSTRACT OF THE DISCLOSURE

Stability of cholesteric-phase liquid-crystal compositions is improved by inocorporating therein an amount, up to 100%, of cholesteryl erucyl carbonate, a novel compound, made by reaction of cholesteryl chloroformate with erucyl alcohol and pyridine. The novel carbonate does not crytallize to true solid in several months, whereas most other liquid-crystal compositions transform to true solid within several hours to several days. Moreover, the novel carbonate does itelf exibit a color play, so that it may be used in very large amounts in cholesteric-phase liquid-crystal compositions, without decreasing the vividness of the color changes exhibited thereby.

BACKGROUND OF THE INVENTION

(1) Field of the invention

This invention relate to a novel chemical compound, cholesteryl erucyl carbonate, to the use thereof as a stabilizer in cholesteric-phase liquid-crystal compositions, to the stabilized compositions and to articles made from them.

(2) Description of the prior art

Liquid-crystal materials have long been known [F. Reinitzer, Wiener Monatschr. Chem. 9, 421 (1888)]. They behave mechanically like liquids (exhibit flow) and optically like crystalline solids (exhibit birefringence). Liquid-crystal material may be classified as cholesteric, nematic or smectic. Many of the cholesteric-phase liquid-crystal materials exhibit selective scattering, i.e., they change apparent color upon slight change in temperature within a color-play temperature range that may range over about 10° C. or more, e.g., red at 16° C. and violet at 26° C., with the other colors of the visible spectrum in between, or may be as narrow as 1° C., e.g., red at 94° C. and violet at 95° C. Such compositions may conveniently be produced as films by dissolving the appropriate compounded compositions in a suitable organic solvent (benzene or petroleum ether may be used) and pouring the solution onto a surface to permit the solvent to evaporate, leaving a film perhaps 1–50 microns thick. The film is then used for temperature mapping (tumors can be detected in this way) or for other purposes.

One difficulty with cholesteric-phase liquid-crystal materials, prior to the present invention, has been that they tend to be unstable, crystallizing into a true solid. This may happen in several hours, or it may take a few weeks. The problem of providing a cholesteric-phase liquid-crystal material that will remain stable, i.e., resist true-solid formation, for a period of as much as a few months is one that has received relatively little attention. Reference is made, however, to our copending application Ser. No. 820,659, filed Apr. 30, 1969, wherein there is disclosed the use of p-nonyl phenyl cholesteryl carbonate, as well as other compounds closely related thereto in structure, as agents for stabilizing cholesteric-phase liquid-crystal materials against true-solid formation. The compositions so produced, however, have the drawback that when their stability is promoted by the addition of large amounts of the stabilizer, the vividness of the observable color change is diminished, since the p-nonyl phenyl cholesteryl carbonate does not itself exhibit a color change.

The production of cholesteryl carbonates is well known to persons versed in the field of cholesteric-phase liquid-crystal materials. Cholesteryl chloroformate, either as a reagent or made in situ by the action of phosgene upon cholesterol, is reacted with pyridine and an alcohol or a phenol, the reaction being driven by the formation of pyridine hydrochloride, which is insoluble in the reaction mixture. The reaction mixture is filtered and the carbonate is then isolated from the filtrate, e.g., by treating the filtrate with methanol to cause precipitation of the desired carbonate. The precipitated carbonate is then recovered by filtration and further worked up in accordance with known procedures.

BRIEF SUMMARY OF THE INVENTION

Stability of cholesteric-phase liquid-crystal compositions is improved by incorporating therein an effective amount, up to 100%, of cholesteryl erucyl carbonate, a new compound.

DESCRIPTION OF THE PREFERRED EMBODIMENTS MAKING CHOLESTERYL ERUCYL CARBONATE

Cholesteryl chloroformate, either as a reagent or formed in situ by reacting phosgene with cholesterol, is reacted with pyridine and erucyl alcohol, with pyridine hydrochloride being precipitated and removed by filtration. The carbonate is then isolated from the filtrate. The chief chemical reaction involved is that of the following equation:

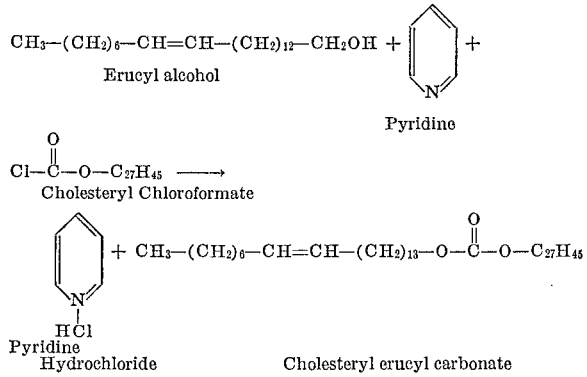

This is illustrated by the following example:

EXAMPLE I

A three-necked glass flask having standard-taper ground-glass joints was fitted with a reflux condenser, a stirrer and an addition funnel. The flask is charged with 0.75 mol (336.9 grams) of cholesteryl chloroformate and 450 milliters of benzene. Heat was applied until a complete solution was effected. In a separate flask, 0.76 mol (246.7 grams) of erucyl alcohol was added to 300 milliliters of benzene, and heat was applied until complete solution was effected. Through the addition funnel, the erucyl alcohol solution was then added to the cholesteryl chloroformate solution. Then, a solution of 0.75 mol (60.7 milliliters) of pyridine dissolved in 75 milliliters of benzene was added dropwise, through the addition funnel, to the contents of the flask. An exothermic reaction resulted, and a white solid was formed. After complete addition of pyridine, the contents of the flask were heated to and maintained at a reflux temperature for 1.0 hour.

The solid formed by the reaction, namely, pyridine hydrochloride, was vacuum-filtered by means of a Buchner funnel. The filtrate (a benzene solution containing the desired product) was treated with methanol, and an oily product came out of the solution. By means of a separatory funnel the oily (lower) layer was separated from the benzene-methanol layer. As prepared, the cholesteryl erucyl carbonate $$(C_{27}H_{45}-O-\overset{\overset{O}{\|}}{C}-O-C_{22}H_{43})$$

exhibited a color-play temperature range of about 25.5° C.–26.5° C., being green at about 26° C. After repeated washings with water, the color-play temperature range of the material was raised to 33.5° C.–34.5° C. The product oil exhibited no tendency to crystallize to a true solid, even after prolonged periods of storage in a refrigerator. Under refrigeration, the material became grease-like in consistency. When used by itself, the compound exhibits a color play within a narrow temperature range.

Using cholesteryl erucyl carbonate

The novel carbonate is used by incorporating it, in amounts up to 100%, in cholesteric-phase liquid-crystal compositions. It may be mixed readily with any of a great number of compounds that are known to exhibit cholesteric-phase liquid crystals at temperatures about 20° C. Reference may be had to British Pat. No. 1,041,490, lines 5–102 of page 4 for a comprehensive (but by no means complete) list of compounds suitable for use in making such compositions. The novel carbonate is effective when used in amounts as small as about 5 weight percent of the stabilized composition, and it may be used in greater amounts, up to 100% by weight. In most instances, it will be desirable to use the compound by itself, or with relatively small amounts, up to about 30%, of other materials, but the possibility of using it in small amounts, such as 5–20 weight percent, simply to stabilize a composition whose color-play temperature range is in large part determined by the other materials present, is not to be overlooked. It is important to note that, unlike the novel p-nonyl phenyl cholesteryl carbonate described in the above-mentioned application Ser. No. 820,659, filed Apr. 30, 1969, this novel carbonate does itself change color, so that stabilized compositions containing great amounts of this carbonate do not lose the vividness in ther changes of color that is desired in compositions of this kind.

The following table presents specific examples that illustrate the use of the novel carbonate in cholesteric-phase liquid-crystal compositions:

TABLE I

| Example | Cholesteryl erucyl carbonate, wt. percent | Other components, wt. percent | Color play temp. range, ° C. |
|---|---|---|---|
| II | 97.5 | 2.5 cholesteryl nonanoate [1] | 27.1–28.2 |
| III | 95.0 | 5.0 cholesteryl nonanoate | 27.6–28.6 |
| IV | 95.0 | 5.0 cholesteryl crotonate [2] | 26.6–27.9 |
| V | 85.0 | 5.0 cholesteryl nonanoate, 10.0 cholesteryl phenyl carbonate.[3] | 23.5–25.2 |
| VI | 75.0 | 15.0 cholesteryl phenyl carbonate, 10.0 cholesteryl nonanoate. | 19–21.2 |
| VII | 70.0 | 15.0 cholesteryl phenyl carbonate, 15.0 cholesteryl laurate.[4] | 26–27.6 |
| VIII | 70.0 | 15.0 cholesteryl myristate,[5] 15.0 cholesteryl phenyl carbonate. | 27.5–29.2 |
| IX | 80.0 | 20.0 cholesteryl phenyl carbonate | 18–19.9 |
| X | 85.0 | 15.0 cholesteryl phenyl carbonate | 21.8–23.3 |
| XI | 90.0 | 10.0 cholesteryl phenylethyl carbonate.[6] | 19.5–21.2 |

[1] Melts at 79.3–80.0° C., clears at 91.8° C.
[2] Melts at 126–128° C., clears at 149° C.
[3] Melts at 124° C.
[4] Melts at 88° C.
[5] Melts at 83° C.
[6] Melts at 98–99.5° C.

The above compositions are made in the usual manner, namely, by mixing the named components in the amounts indicated with suitable solvent, such as benzene or petroleum ether, then forming the film by pouring the mixture onto a surface or substrate to permit the solvent to evaporate therefrom, leaving a stratum of about 1–50 microns thick. The compositions may also be encapsulated or enclosed in an appropriate translucent plastic capsule, the stratum being formed by a layer of the capsules.

None of the compositions in the above table exhibited any true-solid formation within several months.

Although the foregoing teachings and examples relate to cholesteryl erucyl carbonate, it will be possible to prepare and obtain results substantially similar with other compounds closely related in structure and properties. For example, it is apparent that the 5,6-position of cholesteryl may be saturated with hydrogen and/or halogen to yield cholestanol or halocholestanol, and the corresponding carbonates made from this compound may be expected to exhibit similar stabilizing effects.

In view of the foregoing, it is apparent that the effects and advantages of the invention, especially stabilization for a period of about three months or more, may be obtained by preparing and incorporating, in effective amount, in a cholesteric-phase liquid-crystal composition, a compound of the formula:

$$CH_3-(CH_2)_6-\overset{H}{\underset{|}{C}}=\overset{H}{\underset{|}{C}}-C(H_2)_{13}-O-\overset{\overset{O}{\|}}{C}-O-\text{[cholesteryl]}$$

where the linkage $$\diagup\!\!\!\overset{A}{\underset{B}{\phantom{X}}}\!\!\!\diagdown$$

is selected from the group consisting of $$\diagup\overset{|}{\underset{\overset{\|}{C}}{C}}\diagdown,\quad \diagup\overset{|}{\underset{H\,\,CH}{C}}\diagdown\,\text{ and }\,\diagup\overset{|}{\underset{CHX}{C}}\diagdown$$

X being a halogen.

Thus, it is apparent that the invention affords a new class of stabilized cholesteric-phase liquid-crystal compositions that, like the known compositions, will find use in such applications as thermal-pattern sensing devices, vapor-detecting devices, devices for sensing rate of shear, and the like.

While we have shown and described herein certain embodiments of our invention, we intend to cover as well any change or modification therein which may be made without departing from its spirit and scope.

We claim as our invention:

1. A composition of matter for use in stabilizing liquid-crystal compositions against true-solid formation comprising a compound having the formula $$CH_3-(CH_2)_6-\overset{H}{\underset{|}{C}}=\overset{H}{\underset{|}{C}}-(CH_2)_{13}-O-\overset{\overset{O}{\|}}{C}-O-\text{[cholesteryl]}$$

where the linkage $$\diagup\!\!\!\overset{A}{\underset{B}{\phantom{X}}}\!\!\!\diagdown$$

is selected from the group consisting of

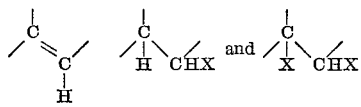

X being a halogen.

2. The composition as defined in claim 1, characterized in that said compound is cholesteryl erucyl carbonate.

3. A liquid-crystal material composition stabilized against true-solid formation, said material containing 5–100 weight per cent of a compound having the formula

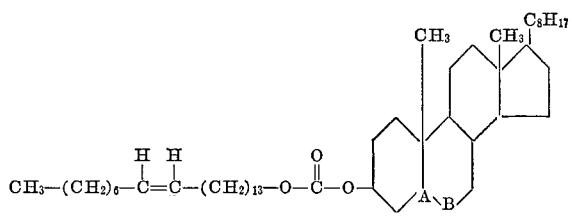

where the linkage

is selected from the group consisting of

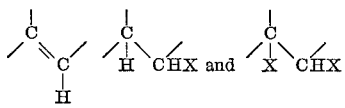

X being a halogen.

4. A composition as defined in claim 3, characterized in that said compound is cholesteryl erucyl carbonate.

5. A composition as defined in claim 3, enclosed in a capsule.

6. A stratum about 1–50 microns thick of a liquid-crystal material containing 5–100 weight percent of the compound having the formula

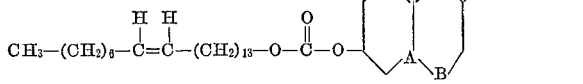

where the linkage

is selected from the group consisting of

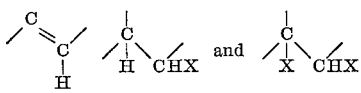

X being a halogen.

7. A stratum as defined in claim 6, characterized in that said liquid-crystal material is in the cholesteric phase.

8. A stratum as defined in claim 6, characterized in that said compound is cholesteryl erucyl carbonate.

References Cited
UNITED STATES PATENTS 3,114,836   12/1963   Fergason et al. _____ 250—83
3,409,404   11/1968   Fergason _____ 252—408

JOHN T. GOOLKASIAN, Primary Examiner

M. E. McCAMISH, Assistant Examiner

U.S. Cl. X.R.

23—230; 161—165, 410; 260—410.5, 469; 350—160